United States Patent
Leoni et al.

(10) Patent No.: US 10,288,972 B2
(45) Date of Patent: May 14, 2019

(54) DISPLAY DEVICE

(71) Applicant: Hewlett-Packard Development Company, L.P., Spring, TX (US)

(72) Inventors: Napoleon J. Leoni, Palo Alto, CA (US); Henryk J Birecki, Palo Alto, CA (US); Omer Gila, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/114,400

(22) PCT Filed: Jan. 31, 2014

(86) PCT No.: PCT/US2014/014303
§ 371 (c)(1),
(2) Date: Jul. 27, 2016

(87) PCT Pub. No.: WO2015/116210
PCT Pub. Date: Aug. 6, 2015

(65) Prior Publication Data
US 2016/0342062 A1    Nov. 24, 2016

(51) Int. Cl.
*G02B 26/00* (2006.01)
*G02B 26/08* (2006.01)
(Continued)

(52) U.S. Cl.
CPC .......... *G02F 1/167* (2013.01); *G02F 1/13338* (2013.01); *G09F 9/372* (2013.01);
(Continued)

(58) Field of Classification Search
CPC ...... G09G 3/344; G09G 2380/14; G09G 3/34; G09G 2380/02; G09G 3/20;
(Continued)

(56) References Cited

U.S. PATENT DOCUMENTS 4,558,334 A    12/1985   Fotland
4,816,653 A    3/1989    Anderl et al.
(Continued)

FOREIGN PATENT DOCUMENTS

JP    7179060     7/1995
JP    11010936    1/1999
(Continued)

OTHER PUBLICATIONS

High reflectivity electrofluidic pixels with zero-power grayscale operation S. Yang, 1 K. Zhou, 2 E. Kreit, 1 and J. Heikenfeld1, a 1Novel Devices Laboratory, School of Electronics and Computing Systems, University of Cincinnati Cincinnati, OH 45221 USA.

*Primary Examiner* — Brandi N Thomas
(74) *Attorney, Agent, or Firm* — Dicke Billig & Czaja PLLC (57) ABSTRACT

A display device includes an electronic paper display imageable by receiving charges on an imaging surface of the electronic paper display. The display device includes an electrode opposite to the imaging surface of the electronic paper display. A network of conductors is on the imaging surface of the electronic paper display and electrically coupled to the electrode.

15 Claims, 7 Drawing Sheets

(51) Int. Cl.
  *G02F 1/29* (2006.01)
  *G02F 1/167* (2019.01)
  *G09F 9/37* (2006.01)
  *G02F 1/1333* (2006.01)
  *G09G 3/34* (2006.01)

(52) U.S. Cl.
  CPC ..... *G09G 3/344* (2013.01); *G02F 2001/1676* (2013.01); *G02F 2202/22* (2013.01); *G09G 2300/0426* (2013.01); *G09G 2380/02* (2013.01)

(58) Field of Classification Search
  CPC ....... G09G 2300/0426; G09G 2310/06; G09G 2320/103; G09G 2300/023; G09G 2300/026; G09G 2310/0278; G09G 2330/021; G09G 2340/16; G09G 3/003; G09G 3/2085; G09G 3/22; G09G 3/3611
  USPC ........ 359/237, 242, 265–267, 273, 290–292, 359/295, 296, 298
  See application file for complete search history.

(56) References Cited

U.S. PATENT DOCUMENTS

| | | | |
|---|---|---|---|
| 4,972,212 | A | 11/1990 | Hauser et al. |
| 5,225,856 | A | 7/1993 | Thieret et al. |
| 5,866,284 | A | 2/1999 | Vincent |
| 6,222,513 | B1 | 4/2001 | Howard et al. |
| 6,333,754 | B1 | 12/2001 | Oba et al. |
| 6,362,845 | B1* | 3/2002 | Genovese ............... B41J 2/39 347/141 |
| 6,400,492 | B1 | 6/2002 | Morita |
| 6,424,387 | B2 | 7/2002 | Sato et al. |
| 6,426,827 | B1 | 7/2002 | Bonhote et al. |
| 6,456,272 | B1 | 9/2002 | Howard |
| 6,515,790 | B2 | 2/2003 | Miyamoto et al. |
| 6,573,880 | B1 | 6/2003 | Simoni et al. |
| 6,738,050 | B2 | 5/2004 | Comiskey et al. |
| 6,795,228 | B2 | 9/2004 | Sacripante et al. |
| 6,982,734 | B2 | 1/2006 | Pan et al. |
| 7,140,550 | B2 | 11/2006 | Ramachandran |
| 7,265,894 | B2 | 9/2007 | Schmitz |
| 7,284,708 | B2 | 10/2007 | Martin |
| 7,463,400 | B1 | 12/2008 | Tatsuura et al. |
| 7,580,845 | B2 | 8/2009 | Burman et al. |
| 7,789,489 | B2 | 9/2010 | Matsuzoe |
| 7,834,843 | B2 | 11/2010 | Karaki |
| 7,855,711 | B2 | 12/2010 | Schmitz |
| 7,975,927 | B1 | 7/2011 | Whitney |
| 8,018,410 | B2 | 9/2011 | Schmitz et al. |
| 8,144,388 | B2 | 3/2012 | Ogawa |
| 8,279,167 | B2 | 10/2012 | Cato |
| 8,379,294 | B2* | 2/2013 | Jun ................. G02F 1/167 345/107 |
| 8,514,256 | B2 | 8/2013 | Ogawa et al. |
| 8,545,302 | B2 | 10/2013 | Wu et al. |
| 2001/0020935 | A1 | 9/2001 | Gelbman |
| 2002/0021911 | A1 | 2/2002 | Matsuura et al. |
| 2003/0067427 | A1 | 4/2003 | Comiskey et al. |
| 2004/0263470 | A1 | 12/2004 | Sprague et al. |
| 2005/0134550 | A1 | 6/2005 | Schmitz |
| 2005/0247797 | A1 | 11/2005 | Ramachandran |
| 2006/0017659 | A1 | 1/2006 | Ogawa |
| 2006/0125778 | A1 | 6/2006 | Apte |
| 2006/0170981 | A1 | 8/2006 | Ricks |
| 2007/0045399 | A1 | 3/2007 | Martin |
| 2007/0061214 | A1 | 3/2007 | Schmitz |
| 2007/0176973 | A1 | 8/2007 | Hisanobu |
| 2007/0188848 | A1 | 8/2007 | Machida et al. |
| 2008/0186259 | A1 | 8/2008 | Todorokihara et al. |
| 2008/0217412 | A1 | 9/2008 | Lane |
| 2008/0292978 | A1 | 11/2008 | Lin |
| 2008/0297878 | A1 | 12/2008 | Brown et al. |
| 2008/0308629 | A1 | 12/2008 | Roskind |
| 2010/0060628 | A1 | 3/2010 | Lenssen |
| 2010/0116894 | A1 | 5/2010 | Modica |
| 2011/0018843 | A1 | 1/2011 | Ogawa |
| 2011/0060640 | A1 | 3/2011 | Thompson |
| 2011/0081527 | A1 | 4/2011 | Yamato |
| 2011/0101111 | A1 | 5/2011 | Roncari |
| 2011/0181532 | A1 | 7/2011 | Pan |
| 2011/0254431 | A1 | 10/2011 | Hirakawa |
| 2011/0298760 | A1 | 12/2011 | Gilea et al. |
| 2011/0304652 | A1 | 12/2011 | Korthuis et al. |
| 2012/0001889 | A1 | 1/2012 | Kimura |
| 2012/0098419 | A1* | 4/2012 | Chiba ................. H01L 51/5206 313/504 |
| 2012/0206341 | A1 | 8/2012 | Gila et al. |
| 2012/0274616 | A1 | 11/2012 | Scribner et al. |
| 2012/0274620 | A1 | 11/2012 | Hwang |
| 2012/0320001 | A1 | 12/2012 | Gila et al. |
| 2013/0003162 | A1 | 1/2013 | Leoni et al. |
| 2013/0235446 | A1* | 9/2013 | Leoni ..................... G02F 1/167 359/296 |
| 2014/0210805 | A1 | 7/2014 | Birecki et al. |
| 2014/0239068 | A1 | 8/2014 | Park |

FOREIGN PATENT DOCUMENTS

| | | |
|---|---|---|
| JP | 2002350905 | 12/2002 |
| JP | 2006035478 | 2/2006 |
| JP | 2008149498 | 7/2008 |
| JP | 2010046848 | 3/2010 |
| JP | 2010069732 | 4/2010 |
| JP | 2011145389 | 7/2011 |
| KR | 20080058956 | 6/2008 |
| KR | 20080064405 | 7/2008 |
| KR | 20080085263 | 9/2008 |
| KR | 20080109408 | 12/2008 |

* cited by examiner

DISPLAY DEVICE

BACKGROUND

Electronic paper ("e-paper") is a display technology designed to recreate the appearance of ink on ordinary paper. Some examples of e-paper reflect light like ordinary paper and may be capable of displaying text and images. Some e-paper is implemented as a flexible, thin sheet, like paper. One familiar e-paper implementation includes e-readers.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Electronic paper ("e-paper") is used in a variety of display applications such as signage, e-books, tablets, cards, posters, and pricing labels. E-paper has several paper-like features. For example, e-paper is a reflective display that uses ambient light as an illumination source. The ambient light strikes the surface and is reflected to the viewer. The usage of pigments similar to those that are used in printing allows the e-paper to be read at a wide range of angles and lighting conditions, including full sunlight. The use of ambient light also eliminates the need for illumination produced by the device, such as a backlight. This minimizes the power used by the e-paper. In addition, the e-paper does not use power to maintain the image. Once the image is written, the image remains on the e-paper for an extended period of time or until the e-paper is rewritten. Thus, a typical e-paper primarily uses power for changing the optical state of the e-paper.

E-paper is typically written by generating a charge on a surface in proximately to a layer of microcapsules that contain charged pigment particles. The charge on the surface attracts or repels the charged pigment particles in the microcapsules to create the desired image. To write to e-paper, however, a writing module used to write to the e-paper has to maintain a connection to a ground return path for the e-paper. In addition, if the surface charges are undesirably disrupted after deposition, the position of the pigment particles may be disturbed. For example, an electrostatic discharge created by touching the surface with a finger after writing may disrupt the surface charges and result in a distorted image.

The following disclosure describes several examples of e-paper display devices that enable a secure electrical connection between a writing module and a ground return path of an e-paper display device. The example display devices also provide image robustness beyond that provided by e-paper alone by providing conductive paths to a ground electrode of the e-paper to prevent accidental electrostatic discharges from users as well as intended image modifications via electrodes from disrupting the image.

Accordingly, a display device, such as a gift card, prepaid card, credit card, shelf tag, boarding pass, shipping label, large format flexible rewritable display, or other suitable display device, includes a passive e-paper display. The e-paper display is imageable by receiving charges on an imaging surface of the e-paper display from a writing module. The display device includes a ground electrode and a network of conductors on the imaging surface of the e-paper display. The imaging surface of the e-paper display is opposite to the ground electrode. The network of conductors is electrically coupled to the ground electrode. During writing of the e-paper display, a conductive roller or brush of the writing module makes contact with the network of conductors to provide a ground return path that allows charges received on the imaging surface to flow to the ground electrode as the writing module and the display device are moved relative to each other.

Figure 1A:
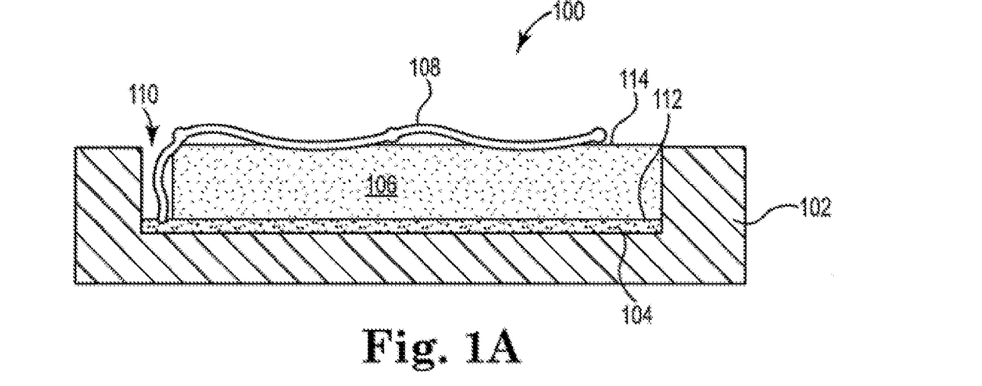
FIG. 1A illustrates a cross-sectional view of one example of a display device.
Figure 1B:
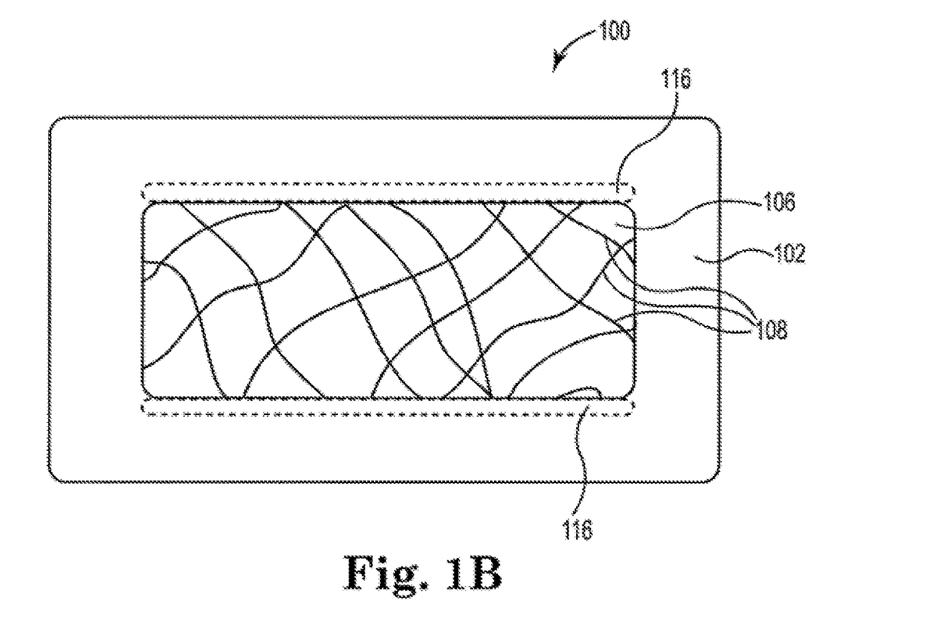
FIG. 1B illustrates a top view of one example of the display device illustrated in FIG. 1A.

FIG. 1A illustrates a cross-sectional view and FIG. 1B illustrates a top view of one example of a display device 100. Display device 100 includes a support structure 102, a ground electrode 104, ground electrode bars 116 (indicated by dashed lines since the ground electrode bars are not visible in the top view), an e-paper display 106, and a network of conductors 108. E-paper display 106 includes an imaging surface 114 and a surface 112 opposite imaging surface 114. Surface 112 contacts ground electrode 104. Ground electrode 104 and e-paper display 106 are mounted in support structure 102 such that imaging surface 114 of e-paper display 106 is exposed. Network of conductors 108 is arranged on imaging surface 114 of e-paper display 106 and electrically coupled to ground electrode 104 at an edge region 110 of e-paper display 106 and/or to ground electrode 104 through ground electrode bars 116 arranged on opposite sides of e-paper display 106. Ground electrode bars 116 are electrically coupled to ground electrode 104.

E-paper display 106 includes an active layer that switches color when a magnetic field or electrical charges are applied to imaging surface 114. In one example, the active layer contains a switchable pigment or die combination. A resin or polymer may be used to encapsulate the active layer. In addition, e-paper 106 may include a functional coating on the imaging surface 114. In one example, e-paper display 106 has a thickness between 70 µm and 300 µm. One example of e-paper 106 is further described below with reference to FIG. 4.

Ground electrode 104 provides a counter-electrode for the imaging of e-paper display 106 by a writing module. Ground electrode 104 along with network of conductors 108 allow counter charges to flow to ground electrode 104 from a writing module. Thus, display device 100 remains basically charge neutral despite charges being ejected onto imaging surface 114. Without a connection between ground electrode 104 and the writing module, no appreciable amount of charges can be ejected onto imaging surface 114 and thus no information can be written to display device 100. Ground electrode 104 can be composed of a transparent conductive material, such as indium tin oxide, or an opaque conductive material. In one example, ground electrode 104 has a thickness between 5 nm and 1 mm.

Support structure 102 can be composed of a transparent material or an opaque material. Support structure 102 can be composed of polyester, plastic, glass, transparent Mylar, or other suitable material. In one example, support structure 102 is shaped to provide a display device 100 in the form of a gift card, prepaid card, credit card, shelf tag, boarding pass, or shipping label.

Network of conductors 108 is an ordered mesh or a random mesh of conductive strands extending over imaging surface 114 of e-paper display 106. The ordered mesh can be in a grid or crisscross pattern, a parallel line pattern, or another suitable pattern. The random mesh can be in a crisscross arrangement as illustrated in FIG. 1B or another suitable arrangement. In one example, the conductive strands are metallic wires partially embedded in a top protective coating of e-paper display 106. In another example, the conductive strands are carbon fibers or a printed layer (e.g., digitally printed or screen printed) of conductive ink on the imaging surface 114 of e-paper display 106. The printed conductive ink may be transparent if imaging surface 114 is also the viewing surface of e-paper display 106. In one example, the conductive strands have a thickness or width less than 20 µm.

The conductive strands of network of conductors 108 have a spatial frequency in a range between 500 µm and several millimeters in one example. The low spatial frequency ensures minimal interference with the imaging process since the areas of e-paper display 106 covered by a conductive strand may not image the same as the rest of e-paper display 106. In addition, the low spatial frequency is sufficient to make an electrical connection with an electrode of a writing module as described in further detail below with reference to FIGS. 8A-8B.

While the conductive mesh of network of conductors 108 is illustrated diagonally and semi-randomly in FIG. 1B, the particular arrangement can vary as long as the width of the conductors is sufficient to carry the current and the spatial frequency of the conductors is sufficient to maintain contact to an electrode of a writing module.

Figure 2A:
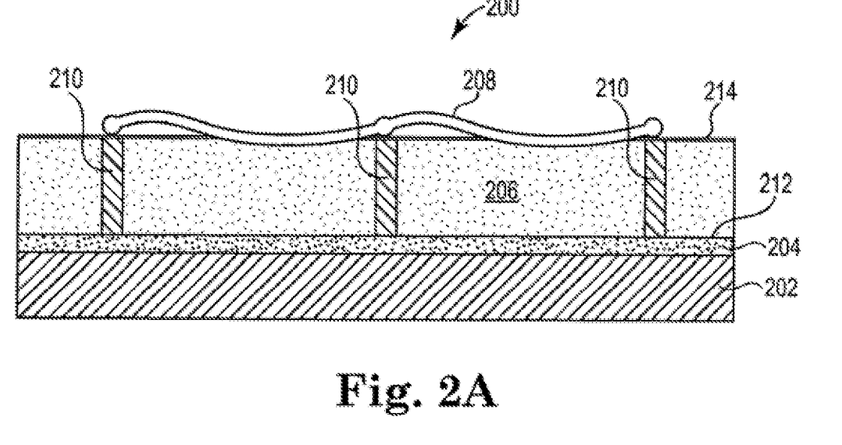
FIG. 2A illustrates a cross-sectional view of another example of a display device.
Figure 2B:
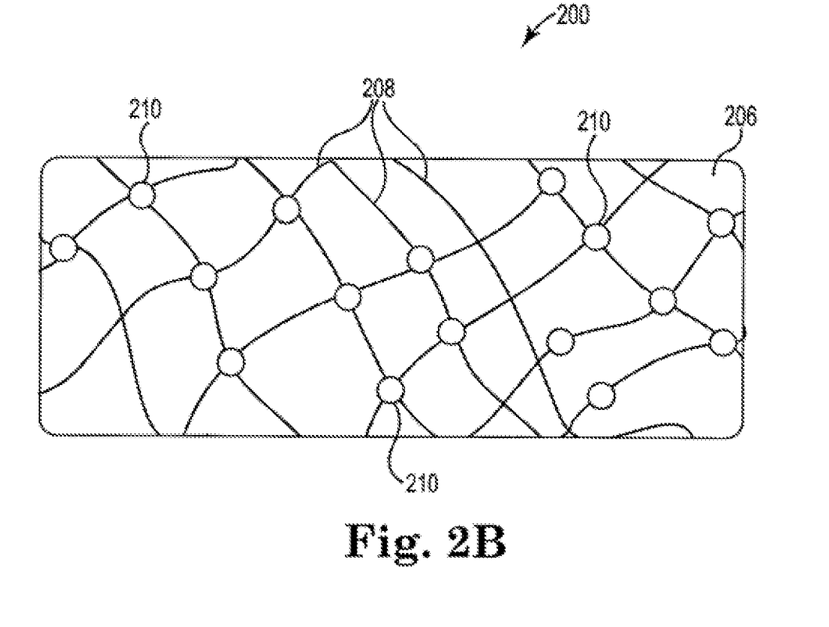
FIG. 2B illustrates a top view of one example of the display device illustrated in FIG. 2A.

FIG. 2A illustrates a cross-sectional view and FIG. 2B illustrates a top view of another example of a display device 200. Display device 200 includes a support structure 202, a ground electrode 204, an e-paper display 206, and a network of conductors 208 and 210. E-paper display 206 includes an imaging surface 214 and a surface 212 opposite imaging surface 214. Surface 212 contacts ground electrode 204. Ground electrode 204 contacts support structure 202. Network of conductors 208 and 210 includes a conductive mesh 208 arranged on imaging surface 214 of e-paper display 206 and a plurality of spaced apart conductive posts 210 extending through e-paper display 206 and electrically coupling conductive mesh 208 to ground electrode 204. Conductive posts 210 are composed of a metal or other suitable electrically conductive material.

E-paper display 206 is similar to e-paper display 106 previously described and illustrated with reference to FIGS. 1A-1B, except that conductive posts 210 extend through e-paper display 206. Ground electrode 204 is similar to ground electrode 104 previously described and illustrated with reference to FIGS. 1A-1B. Support structure 202 is similar to support structure 102 previously described and illustrated with reference to FIGS. 1A-1B, except that support structure 202 has the same length and width as e-paper display 214 and ground electrode 204 to provide a borderless display device 200.

Conductive mesh 208 is similar to conductive mesh 108 previously described and illustrated with reference to FIGS. 1A-1B, except that the conductive strands of conductive mesh 208 are electrically coupled to conductive posts 210. In one example, conductive posts 210 have a diameter between 20 µm and 50 µm. The spatial frequency of conductive posts 210 is similar to or less than the spatial frequency of conductive mesh 208. Conductive posts 210 can be arranged in a pattern within e-paper display 210 or arranged randomly within e-paper display 210. For example, conductive posts 210 can be arranged in rows and columns or randomly as illustrated in FIG. 2B. Since conductive posts 210 electrically connect conductive mesh 208 to ground electrode 204 directly through e-paper display 206, display device 200 can be a borderless display device as illustrated in FIGS. 2A-2B.

Figure 3A:
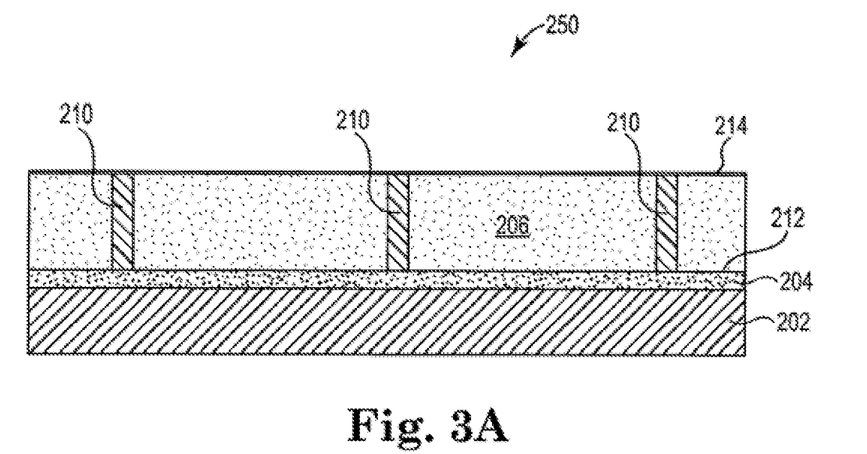
FIG. 3A illustrates a cross-sectional view of another example of a display device.
Figure 3B:
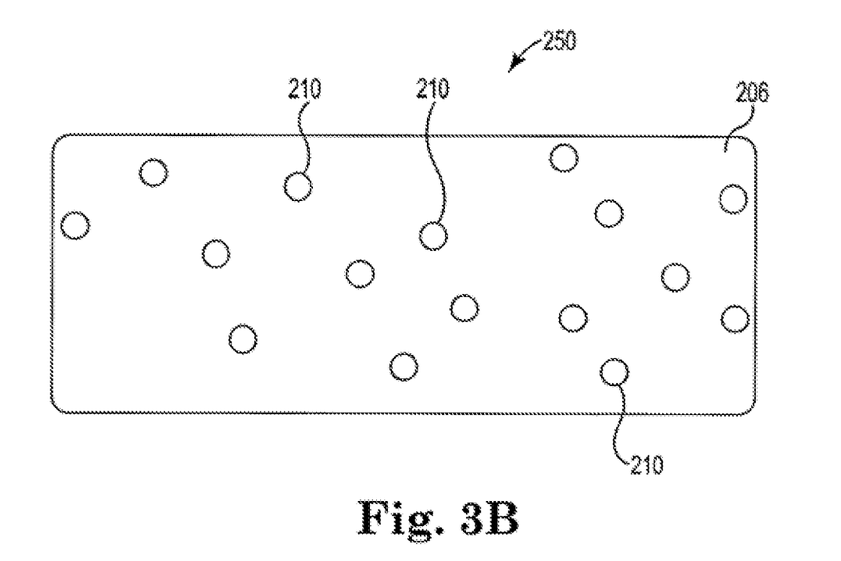
FIG. 3B illustrates a top view of one example of the display device illustrated in FIG. 3A.

FIG. 3A illustrates a cross-sectional view and FIG. 3B illustrates a top view of another example of a display device 250. Display device 250 is similar to display device 200 previously described and illustrated with reference to FIGS. 2A-2B, except that display device 250 excludes conductive mesh 208. In this example, conductive posts 210 provide a connection to ground electrode 204 during writing of e-paper display 206 via a writing module.

Conductive posts 210 can be arranged in a pattern within e-paper display 210 or arranged randomly within e-paper display 210. For example, conductive posts 210 can be arranged in rows and columns or randomly as illustrated in FIG. 3B. In one example, conductive posts 210 have a spatial frequency in a range between 500 µm and several millimeters. The spatial frequency of conductive posts 210 is sufficient for a writing module to have a continuous connection to ground electrode 204 via conductive posts 210 as the writing module and display device 250 are moved relative to each other.

Figure 4:
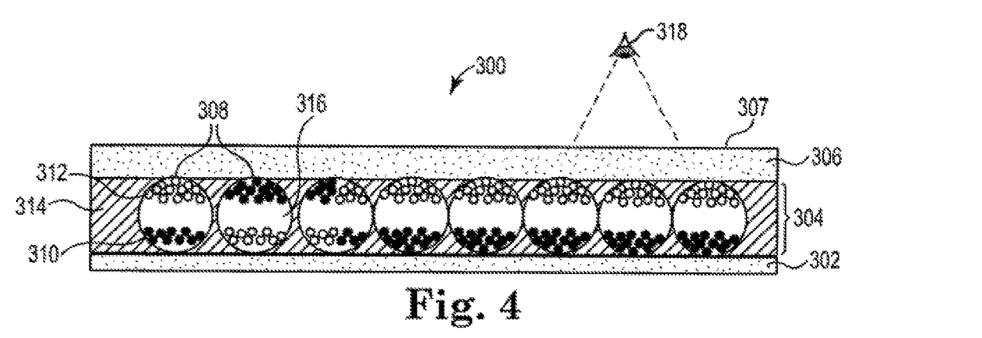
FIG. 4 illustrates a cross-sectional view of one example of an electronic paper ("e-paper") display.

FIG. 4 illustrates a cross-sectional view of one example of an e-paper display 300. In one example, e-paper display 300 is used for e-paper display 106 or 206 previously described and illustrated with reference to FIGS. 1A-1B, 2A-2B, and 3A-3B. E-paper display 300 includes a ground electrode 302, an active layer 304, and a transparent charge receiving layer 306. Active layer 304 includes microcapsules 308 encapsulated by a resin or polymer 314. In one example, each microcapsule 308 includes black particles 310 and white particles 312 suspended in a fluid medium 316. Surface 307 of charge receiving layer 306 provides the imaging surface for e-paper display 300 and is also the viewing side for a viewer 318 in this example.

Ambient light is transmitted through charge receiving layer 306, strikes microcapsules 308, and is reflected back to the viewer 318. When white particles 312 of a microcapsule 308 are located near charge receiving layer 306, the microcapsule appears white to a viewer 318. When black particles 310 of a microcapsule 308 are located near charge receiving layer 306, the microcapsule appears black to the viewer 318. The particles 310 and 312 have opposite charges. For example, black particles 310 can be positively charged particles, and white particles 312 can be negatively charged particles. Various shades of gray can be created by varying the arrangement of alternating microcapsules with white and black particles located near charge receiving layer 306 to produce halftoning.

Microcapsules 308 exhibit image stability using chemical adhesion between particles and/or between the particles and the microcapsule surface. For example, microcapsules 308 can hold text and images indefinitely without using electricity, while allowing the text or images to be changed later.

The structure, materials, and dimensions of the various layers and components of e-paper display 300 can be adapted to specific design criteria. In one example, the transparent charge receiving layer 306 can be composed of a transparent polymer and can have a thickness between 50 µm and 250 µm. The transparent charge receiving layer 306 can also be composed of a material that holds charges or is porous or semi-porous to charges and/or ions.

The diameter of each microcapsule 308 is substantially constant within e-paper display 300 and can be in one example between 20 µm and 100 µm, such as 50 µm. Conductive ground electrode 302 can be composed of a transparent conductive material, such as indium tin oxide, or an opaque material. In one example, ground electrode 302 has a thickness between 10 nm and 1 mm, or larger depending on how e-paper display 300 is to be used.

In other examples, E-paper display 300 has a variety of other configurations. For example, each microcapsule 308 may include black particles suspended in a white colored fluid. The black particles can be positively charged particles or negatively charged particles. One or more microcapsules form a pixel of black and white images displayed on e-paper display 300. The black and white images are created by placing black particles near or away from charge receiving layer 306. For example, the microcapsules with black particles located away from charge receiving layer 306 reflect white light, corresponding to a white portion of an image displayed on e-paper display 300. In contrast, the microcapsules with black particles located near charge receiving layer 306 appear black to a viewer 318 corresponding to a black portion of the image displayed on e-paper display 300. Various shades of gray can be created by using halftoning with black particles located near or away from charge receiving layer 306.

Charge receiving layer 306 may be tinted with alternating blue, red, and green regions. Adjacent blue, red, and green regions form color pixels. Color images are created by placing different combinations of white or black particles near charge receiving layer 306. For example, the microcapsules of a color pixel with white particles located near the red and green regions of charge receiving layer 306 reflect red and green light from e-paper display 300. The viewer 318 will perceive this combination as a yellow pixel. When the black particles in the microcapsules are located near charge receiving layer 306, that color pixel will appear black to the viewer 318. Additionally or alternatively, the black particles 310 of each microcapsule can be replaced by blue, red, or green positively or negatively charged particles. The particles can be used alone or in combination with a tinted charge receiving layer 306 to create a desired color image.

Figure 5A:
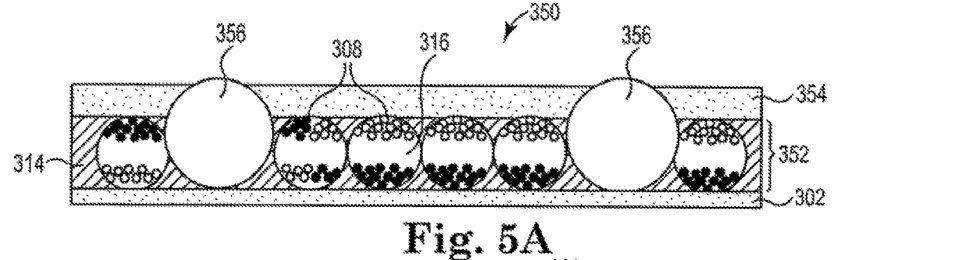
FIG. 5A illustrates a cross-sectional view of another example of a display device.

FIG. 5A illustrates a cross-sectional view of another example of a display device 350. Display device 350 includes a ground electrode 302, an active layer 352, and a charge receiving layer 354. Active layer 352 includes microcapsules 308 encapsulated by a resin or polymer 314 as previously described and illustrated with reference to FIG. 4. In addition, active layer 352 includes a plurality of spaced apart conductive spheres 356 that extend through charge receiving layer 354 and active layer 352 to electrically contact ground electrode 302. In this example, conductive spheres 356 provide a connection to ground electrode 302 during writing of e-paper display 350 via a writing module.

Conductive spheres 356 have a diameter larger than the diameter of microcapsules 308 such that a portion of each conductive sphere extends through charge receiving layer 354. In one example, conductive spheres 356 are composed of a metal or other suitable electrically conductive material. Conductive spheres 356 are dispersed with microcapsules 308 in the proper proportion to have a spatial frequency in a range between 2.5 mm and 15 mm. The conductive spheres can be arranged randomly within active layer 352 or in a pattern as long as the desired spatial frequency is provided. In other examples, conductive spheres 356 could be replaced by conductive elements having another suitable shape, such as a cuboid, cylinder, pyramid, or prism shape. Conductive spheres 356 provide a similar function as conductive posts 210 previously described and illustrated with reference to FIGS. 3A-3B.

Figure 5B:
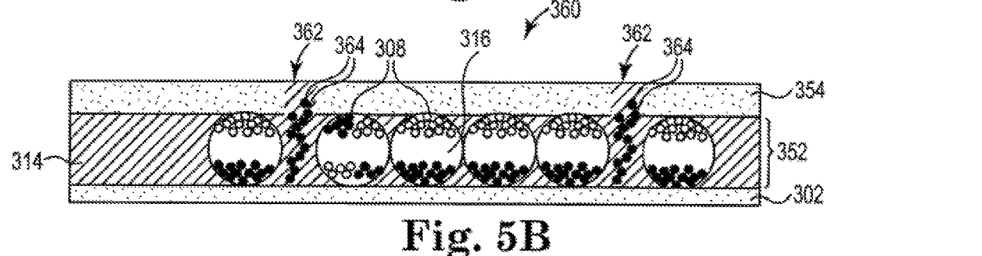
FIG. 5B illustrates a cross-sectional view of another example of a display device.

FIG. 5B illustrates a cross-sectional view of another example of a display device 360. Display device 360 includes a ground electrode 302, an active layer 352, and a charge receiving layer 354. Active layer 352 includes microcapsules 308 encapsulated by a resin or polymer 314 as previously described and illustrated with reference to FIG. 4. In addition, active layer 352 includes a plurality of spaced apart conductive paths 362 that extend through charge receiving layer 354 and active layer 352 to electrically contact ground electrode 302. In this example, conductive paths 362 provide a connection to ground electrode 302 during writing of e-paper display 360 via a writing module.

Conductive paths 362 are formed by locally increasing the conductivity of resin or polymer 314. In one example, the conductivity of resin or polymer 314 is locally increased by doping resin or polymer 314 with particles or fibers 364. In one example, the resistivity of conductive paths 362 is between 1 Ohm-m and 70 Ohm-m. Conductive paths 362 can have any suitable shape, such as posts or spheres. Conductive paths 362 are arranged with microcapsules 308 in the proper proportion to have a spatial frequency in a range between 2.5 mm and 15 mm. The conductive paths can be arranged randomly within active layer 352 or in a pattern as long as the desired spatial frequency is provided. Conductive paths 364 provide a similar function as conductive posts 210 previously described and illustrated with reference to FIGS. 3A-3B.

Figure 6:
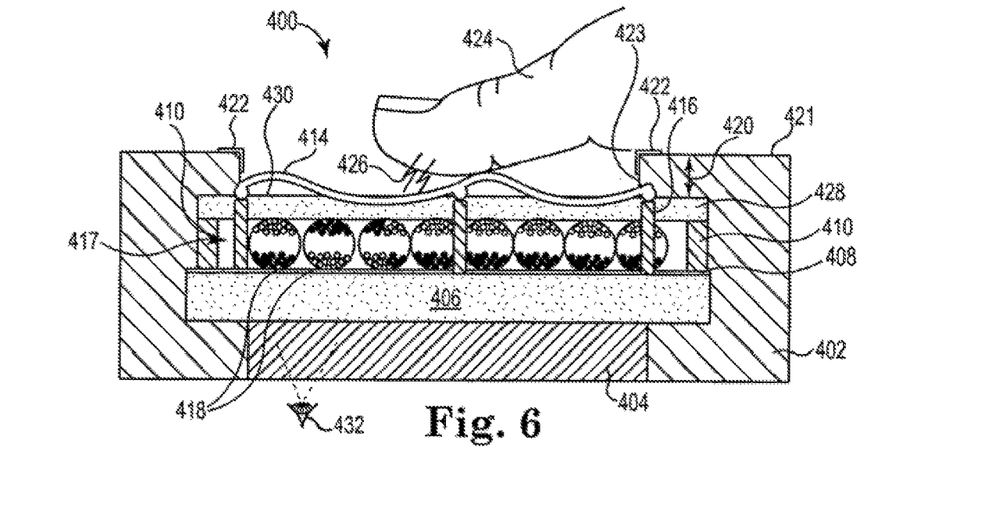
FIG. 6 illustrates a cross-sectional view of another example of a display device.

FIG. 6 illustrates a cross-sectional view of another example of a display device 400. Display device 400 includes a support structure 402, a conductive element 422, a structural window 404, a transparent substrate 406, a transparent ground electrode 408, and an e-paper display 417 including microcapsules 418, a ground path 410, a charge receiving layer 428, and a network of conductors 414 and 416. E-paper display 417 includes an imaging surface 430 and a viewing side as indicated by viewer 432. Ground electrode 408 contacts transparent substrate 406. Support structure 402 encircles substrate 406, ground electrode 408, and e-paper display 417. Network of conductors 414 and 416 includes a conductive mesh 414 arranged on imaging surface 430 of e-paper display 417 and a plurality of conductive posts 416 extending through e-paper display 417 and electrically coupled to ground electrode 408. Network of conductors 414 and 416 is similar to network of conductors 208 and 210 previously described and illustrated with reference to FIGS. 2A-2B.

Ground path 410 provides a path for dissipating charges applied to imaging surface 430 during writing of display device 400. In this example, charges travel laterally through charge receiving layer 428 and then down through ground path 410 to ground electrode 408. The resistivity of charge receiving layer 428 is selected so that the desired image quality and dissipation time constant are obtained.

Transparent substrate 406 includes a transparent Mylar, glass, or other suitable transparent material. In one example, transparent substrate 406 has a thickness of 100 μm or larger. Structural window 404 extends through support structure 402 so that a viewer 432 can see the image on e-paper display 417. Structural window 404 can be an air gap or be composed of glass, transparent plastic, or other suitable transparent material.

Support structure 402 defines a frame having a thickness indicated at 420 that provides a recessed imaging surface 430 with respect to support structure 402. In one example, the thickness 420 of the frame is between 100 μm and 300 μm. The rim of the frame surrounding imaging surface 430 includes a conductive element 422, which is electrically coupled to ground electrode 408. Conductive element 422 is made of a metal or other suitable electrically conductive material. In one example, conductive element 422 extends over at least a portion of a top surface 421 of support structure 402 and over at least a portion of an inner side surface 423 of support structure 402.

Further, network of conductors 414 and 416 and conductive element 422 provide protection against accidental or intended image disruption. One potential source of image disruption is accidental electrostatic discharges from users. Network of conductors 414 and 416 and conductive element 422 provide a current path for dissipating accidental electrostatic discharges, such as 426, from a user touching network of conductors 414 and 416 and/or conductive element 422 as indicated for example by finger 424.

Figure 7A:
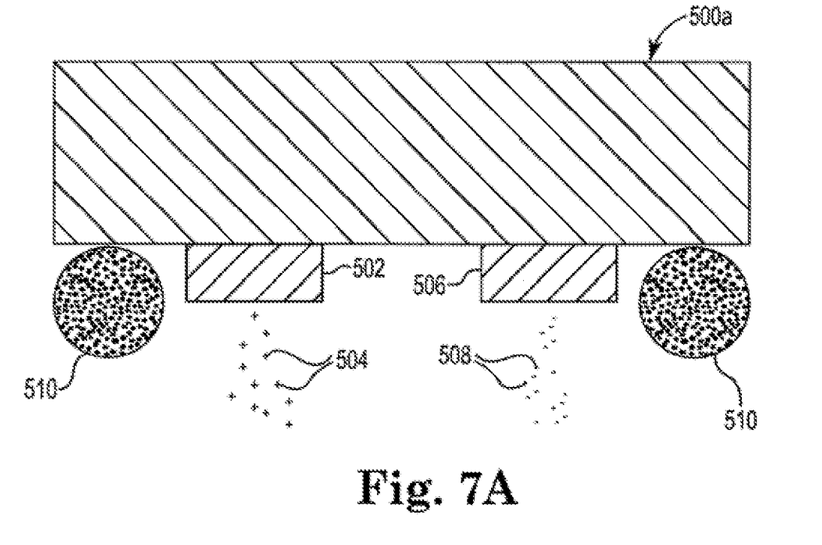
FIG. 7A illustrates one example of a writing module.

FIG. 7A illustrates one example of a writing module 500a. Writing module 500a can be used to write information to display device 100, 200, 250, 350, 360, and/or 400 previously described and illustrated with reference to FIGS. 1A-1B, 2A-2B, 3A-3B, 5A-5B, and 6, respectively. Writing module 500a includes a corona writing unit 502, a corona erasing unit 506, and conductive rollers 510. Corona writing unit 502, corona erasing unit 506 and conductive rollers 510 are located on the same side of writing module 500a.

Corona erasing unit 506 selectivity ejects negative ions 508 toward an imaging surface of an e-paper display to erase any text and/or images on the e-paper display by repelling the negatively charged particles and/or by attracting the positively charged particles within the e-paper display toward the imaging surface. Corona writing unit 502 selectively ejects positive ions 504 toward an imaging surface of an e-paper display to write desired text and/or images on the e-paper display by repelling the positively charged particles and/or by attracting the negatively charged particles within the e-paper display toward the imaging surface.

Conductive rollers 510 are electrodes that make contact with the network of conductors on the imaging surface of a display device during writing of the display device to provide an electrical connection to the ground electrode of the display device. Conductive rollers 510 also set the spacing between corona writing unit 502 and corona erasing unit 506 and the display device during writing of the display device. Conductive rollers 510 are composed of any suitable electrically conductive material, such as a metal or a conductive rubber.

Figure 7B:
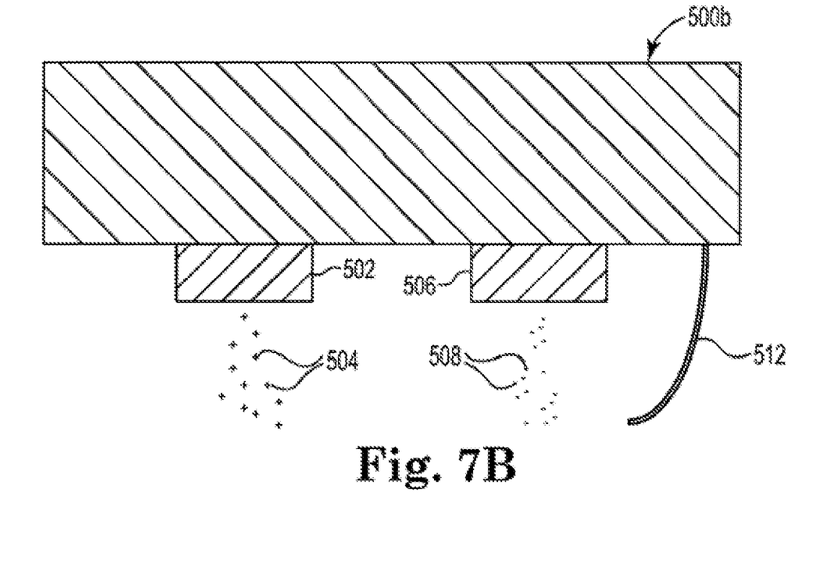
FIG. 7B illustrates another example of a writing module.

FIG. 7B illustrates another example of a writing module 500b. Writing module 500b can be used to write information to display device 100, 200, 250, 350, 360, and/or 400 previously described and illustrated with reference to FIGS. 1A-1B, 2A-2B, 3A-3B, 5A-5B, and 6, respectively. Writing module 500b is similar to writing module 500a previously described and illustrated with reference to FIG. 7A, except that writing module 500b includes a conductive brush 512 in place of conductive rollers 510. Conductive brush 512 makes contact with the network of conductors on the imaging surface of a display device during writing of the display device to provide an electrical connection to the ground electrode of the display device. Conductive brush 512 is composed of any suitable electrically conductive material, such as a metal, a conductive rubber, or a conductive polymer.

Figure 8A:
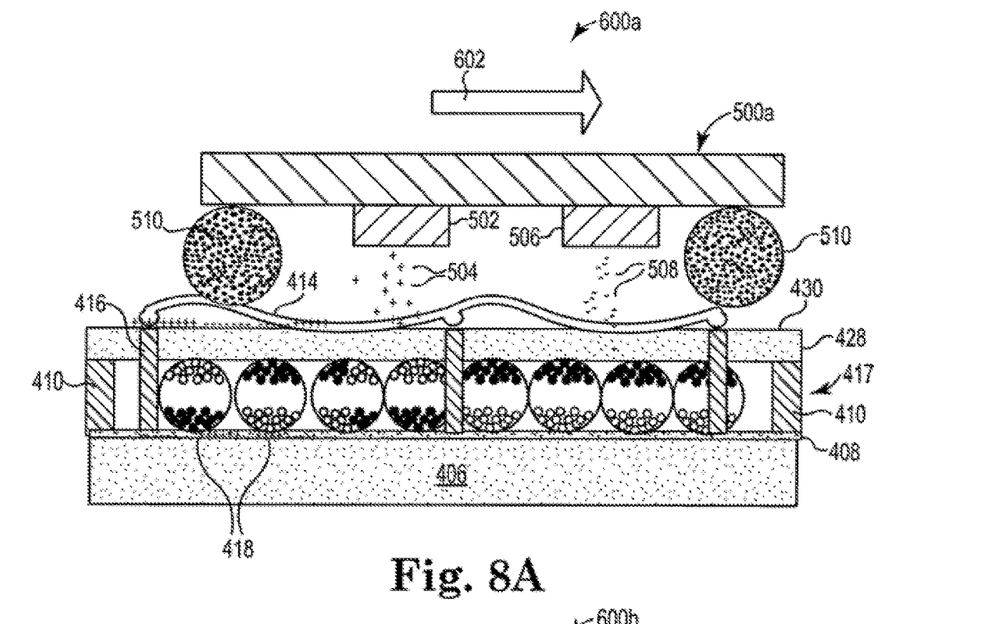
FIG. 8A illustrates one example of a system including a writing module and a display device.

FIG. 8A illustrates one example of a system 600a including a writing module 500a and a display device 417. Writing module 500a was previously described and illustrated with reference to FIG. 7A, and display device 417 was previously described and illustrated with reference to FIG. 6. To write to display device 417, writing module 500a is brought into contact with display device 417 so that conductive rollers 510 contact network of conductors 414. Conductive rollers 510 electrically couple writing module 500a to ground electrode 408 via network of conductors 414 and 416.

Writing module 500a can be moved in the direction indicated by arrow 602 and display device 417 can be held stationary, display device 417 can be moved in the opposite direction indicated by arrow 602 and writing module 500a can be held stationary, or display device 417 and writing module 500a can be moved simultaneously with respect to each other.

In this example, the black particles of microcapsules 418 are positively charged particles, and the white particles of microcapsules 418 are negatively charged particles. Corona erasing unit 506 erases any information stored in microcapsules 418 prior to writing information with corona writing unit 502. As display device 417 passes under writing module 500a, corona erasing unit 506 ejects negative ions 508 onto imaging surface 430. The negative ions 508 repel negatively charged white particles away from imaging surface 430 and attract positively charged black particles toward imaging surface 430. By passing corona erasing unit 506 over imaging surface 430, any information previously written to display device 417 is erased by positioning the positively charged black particles near the top of microcapsules 418 and pushing the negatively charged white particles to the bottom of microcapsules 418.

Corona writing unit 502 writes information to microcapsules 418. As display device 417 passes under writing module 500a, corona writing unit 502 selectively ejects positive ions 504 toward imaging surface 430 when a region of display device 417 is to be changed from black to white. The positive ions 504 repel positively charged black particles away from imaging surface 430 and attract negatively charged white particles toward imaging surface 430. By passing corona writing unit 502 over imaging surface 430 and selectively ejecting positive ions onto imaging surface 430, information is written to display device 417 by selectively positioning negatively charged white particles near the top of microcapsules 418 and selectively pushing the positively charged black particles to the bottom of microcapsules 418.

Figure 8B:
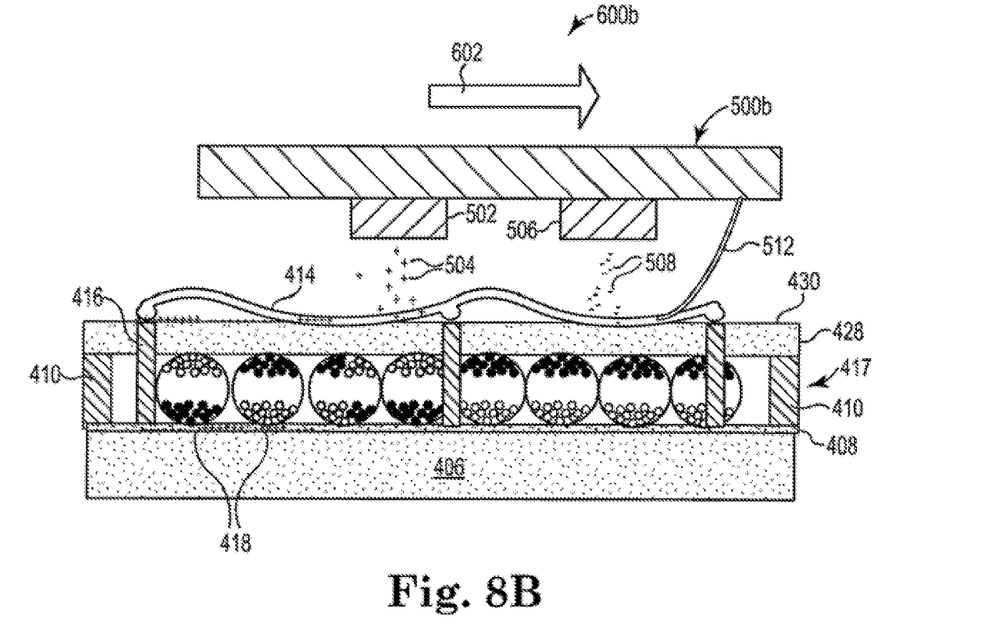
FIG. 8B illustrates another example of a system including a writing module and a display device.

FIG. 8B illustrates another example of a system 600b including a writing module 500b and a display device 417. Writing module 500b was previously described and illustrated with reference to FIG. 7B, and display device 417 was previously described and illustrated with reference to FIG. 6. System 600b operates similarly to system 600a previously described and illustrated with reference to FIG. 8A, except that in system 600b the ground connection between writing module 500b and display device 430 is provided by conductive brush 512.

Figure 9:
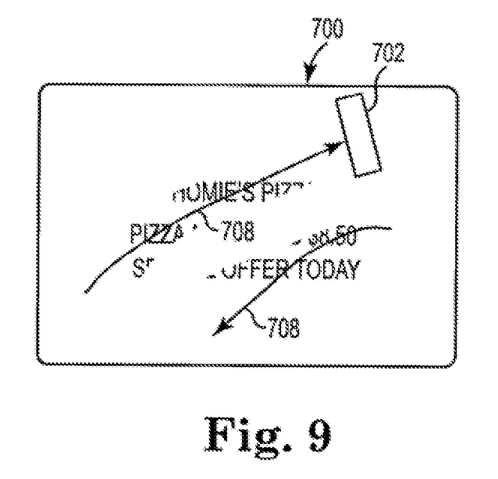
FIG. 9 illustrates one example of a display device being imaged by a handheld writing module.

FIG. 9 illustrates one example of a display device 700 being imaged by a handheld writing module 702. In this example, the handheld writing module 702 is smaller than the display device 700. The path of writing is indicated by arrows 708 and can be random. Display device 700 is a large format display and includes a network of conductors to provide a connection to the ground electrode from writing module 702 as previously described and illustrated with reference to FIG. 1A-1B, 2A-2B, 3A-3B, 5A-5B, or 6. Handheld writing module 702 can include a writing module 500a or 500b as previously described and illustrated with reference to FIGS. 7A and 7B, respectively. The network of conductors on the imaging surface of display device 700 enables a continuous electrical connection between writing module 702 and the ground electrode of the display device as the writing module is moved across the display device.

Imaged features, (i.e., either permanent such as dot patterns or features present in the image existing in the display device itself) can be used together with an imaging device, such as a Charge-Coupled Device (CCD), to provide position feedback so that the information displayed on display device 700 can be updated by scanning handheld writing module 702 across the display device in a non-predetermined path. Alternatively, handheld writing module 702 can use optical mouse scanning technology and navigate its position by detecting the rate of motion from the surface topography of the display device 700. In a further example, display device 700 can be marked with IR, UV, or fluorescent dot patterns that can be used to determine the position and orientation of handheld writing module 702 relative to display device 700.

By including a network of conductors on the imaging surface of a display device, an electrical connection between the writing module and the ground electrode of the display device can be maintained during movement of the writing module and the display device relative to each other. The network of conductors also improves image robustness of the display device by providing conductive paths to ground to prevent accidental electrostatic discharges from users from altering the image. The conductive paths to ground also prevent intended image modifications via electrodes applied to the display device by users. The network of conductors enables these features with minimal disruption to the process for writing images to the display device.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A display device comprising:
   an electronic paper display comprising an imaging surface and a further surface opposite to the imaging surface, the electronic paper display imageable by receiving charges on the imaging surface;
   an electrode on the further surface opposite to the imaging surface; and
   a network of electrically coupled conductors on the imaging surface and electrically coupled to the electrode.

2. The display device of claim 1, wherein the network of conductors comprises a conductive mesh.

3. The display device of claim 1, wherein the network of conductors comprises a plurality of spaced apart conductive elements extending from the imaging surface of the electronic paper display to the electrode.

4. The display device of claim 1, further comprising:
   a frame surrounding the electronic paper display; and
   a conductive element arranged on a rim of the frame and surrounding the electronic paper display, the conductive element electrically coupled to the electrode.

5. The display device of claim 1, wherein the network of conductors provides a current path to the electrode for electrostatic discharges to prevent disruption of an image of the electronic paper display.

6. A display device comprising:
   an electronic paper display comprising an imaging surface and a further surface opposite to the imaging surface, the electronic paper display imageable by receiving charges on the imaging surface;
   a ground electrode on the further surface opposite to the imaging surface; and
   an electrically coupled conductive mesh on the imaging surface, the conductive mesh electrically coupled to the ground electrode to provide a ground return path that allows charges deposited on the imaging surface to flow to the ground electrode.

7. The display device of claim 6, wherein the conductive mesh is electrically coupled to the ground electrode through a plurality of conductive elements extending from the imaging surface through the electronic paper display to the ground electrode.

8. The display device of claim 6, wherein conductive strands of the conductive mesh have a width less than 20 µm.

9. The display device of claim 6, wherein the conductive mesh has a spatial frequency between 500 µm and 10 mm.

10. The display device of claim 6, wherein the conductive mesh is electrically coupled to the ground electrode via a conductive path adjacent to the electronic paper display.

11. A system comprising:
    a writing module comprising a writing unit and a conductive roller or brush, the writing module to write to a display device, the display device comprising:
      an electronic paper display comprising an imaging surface and a further surface opposite to the imaging surface, the electronic paper display imageable by receiving charges on the imaging surface from the writing unit;
      a ground electrode on the further surface opposite to the imaging surface; and
      a network of electrically coupled conductors on the imaging surface and electrically coupled to the ground electrode;

wherein the conductive roller or brush is to contact the network of conductors to provide a ground return path that allows charges received on the imaging surface to flow to the ground electrode during writing of the electronic paper display as the writing module and display device are moved relative to each other.

12. The system of claim 11, wherein the network of conductors comprises a plurality of conductive elements extending through the electronic paper display from the imaging surface to the ground electrode.

13. The system of claim 12, wherein the plurality of conductive elements comprises conductive posts.

14. The system of claim 12, wherein the electronic paper display includes a plurality of microcapsule spheres containing charged pigments and having a first diameter, and wherein the conductive elements comprise conductive spheres extending through the electronic paper display and having a second diameter, the second diameter greater than the first diameter.

15. The system of claim 12, further comprising:
a conductive mesh on the imaging surface of the electronic paper display, the conductive mesh electrically coupled to the plurality of conductive elements.

* * * * *

UNITED STATES PATENT AND TRADEMARK OFFICE
CERTIFICATE OF CORRECTION

PATENT NO.       : 10,288,972 B2
APPLICATION NO.  : 15/114400
DATED            : May 14, 2019
INVENTOR(S)      : Napoleon J. Leoni et al.

Page 1 of 1

It is certified that error appears in the above-identified patent and that said Letters Patent is hereby corrected as shown below:

On the Title Page

In item (72), Inventors, in Column 1, Line 2, delete "Henryk J Birecki," and insert
-- Henryk Birecki, --, therefor.

Signed and Sealed this
Tenth Day of September, 2019

Andrei Iancu
*Director of the United States Patent and Trademark Office*